United States Patent [19]

Beckwith

[11] Patent Number: 4,533,835
[45] Date of Patent: Aug. 6, 1985

[54] CONTROL APPARATUS FOR HYDRAULICALLY DRIVEN GENERATOR

[76] Inventor: Sterling Beckwith, 1824 Doris Dr., Menlo Park, Calif. 94025

[21] Appl. No.: 589,974

[22] Filed: Mar. 15, 1984

[51] Int. Cl.³ .............................................. F03B 15/02
[52] U.S. Cl. .......................................... 290/43; 290/52
[58] Field of Search .............................. 290/43, 52, 54; 415/2-4; 417/18, 21-24

[56] References Cited

U.S. PATENT DOCUMENTS

| | | | |
|---|---|---|---|
| 3,750,001 | 7/1973 | McCloskey | 290/43 X |
| 4,142,367 | 3/1979 | Guisti | 290/54 X |
| 4,276,482 | 6/1981 | Crockett | 290/52 |
| 4,352,024 | 9/1982 | Geary et al. | 290/52 |

*Primary Examiner*—William M. Shoop
*Assistant Examiner*—W. E. Duncanson, Jr.
*Attorney, Agent, or Firm*—Townsend and Townsend

[57] ABSTRACT

Apparatus for controlling a hydraulically driven generator for supplying electrical power to power mains. The generator is coupled to a turbine driven by a fluid flow through a duct. The duct has a one-fourth turn butterfly valve controlled by a fluid-actuated operator and the operator receives fluid from the duct by way of a normally closed valve which, when energized, creates water pressure on the operator for opening the butterfly valve. A second, normally open solenoid provides an emergency exit for the water from the operator to relieve the water pressure thereon and thereby close the butterfly valve when certain conditions exist, such as sudden loss of line voltage, overvoltage or deviation in frequency of the line voltage. A differential pressure switch across the turbine rotor also controls the starting of the system to assure proper flow of fluid through the duct before commencing operation of the generator itself.

15 Claims, 1 Drawing Figure

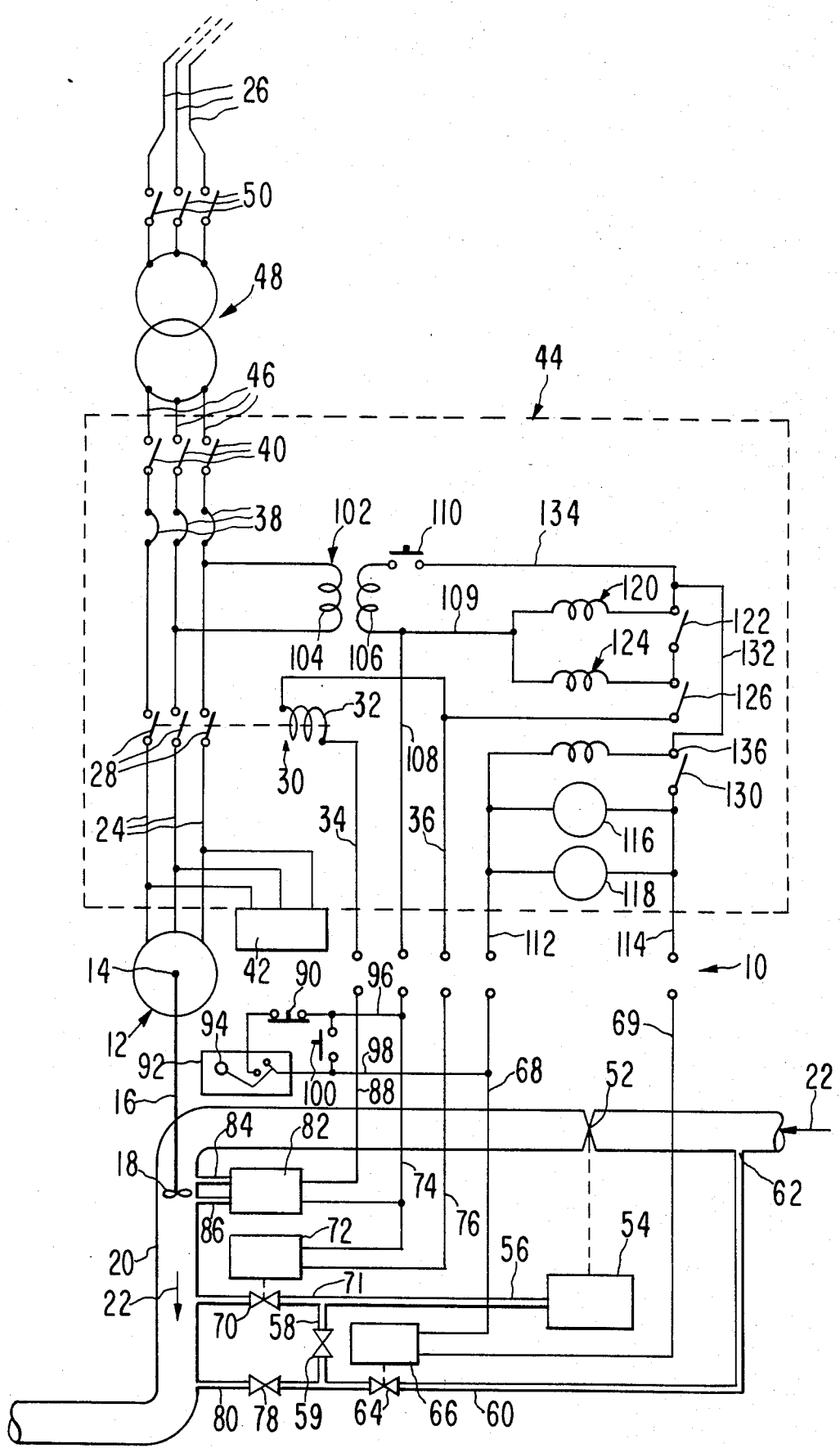

CONTROL APPARATUS FOR HYDRAULICALLY DRIVEN GENERATOR

This invention relates to improvements in the control of hydraulically driven generators for supplying electrical power and, more particularly, to an apparatus for controlling the operation of such a generator when it is unattended to guard against problems associated with sudden loss of line voltage, overvoltage and the like.

BACKGROUND OF THE INVENTION

When an unattended hydraulically driven generator has a spring-closed butterfly valve coupled to a fluid-actuated valve operator, the unit will go to overspeed in a very few seconds when power is lost. Such overspeed is undesirable and noisy and could cause damage to components in the system associated with the generator. A need, therefore, exists for an improved control apparatus which provides for removal of the generator from a power line when emergency conditions exist, such as a sudden loss of line voltage or an overvoltage surge.

SUMMARY OF THE INVENTION

The present invention satisfies the aforesaid need and provides apparatus to provide a more rapid exit of the fluid from the valve operator by the use of solenoid-actuated valve means which provides for rapid closing of the butterfly valve. The generator is essentially a pump running in reverse direction of rotation and typically is without the use of a governor. Such a generator is small in size and will inherently have a speed which is high enough so that a standard induction motor can be used as the generator.

An objective of the present invention is to provide an improved hydraulic starting system using a conventional operator having a spring return hydraulic piston which operates a one-fourth turn butterfly valve. Such a valve opens and closes at a slow rate but, with the present invention, can be automatically closed quite rapidly upon loss of power on the line. This is accomplished by use of a solenoid valve which relieves the hydraulic pressure on the piston and permits the spring of the butterfly valve operator to close the valve more rapidly.

The present invention also includes the use of a differential pressure switch to close the circuit to the output power line of the generator when the speed of the generator reaches a point slightly above synchronous speed. The differential pressure switch is also used to disconnect the generator from the power line when the load on the generator is dropped to a zero value. The differential pressure switch is connected to operate on a difference of the hydraulic pressure on opposite sides of the turbine rotor. The turbine will be operating at the same speed when the throttle valve closes, but tests have shown that the slight difference in water flow and torque when accelerating through synchronous speed and when closing the throttle on shutdown is adequate to provide the necessary difference to operate the differential pressure switch. Such action is desirable when the unit is to operate unattended.

The use of a time delay relay permits the unit to drop below synchronous speed for a short interval when power is lost, so that a hydraulic start, and not an electrical reclosing, will take place in a given time after a momentary outage. When the generator has its voltage supply interrupted, its speed will rise very rapidly. To avoid transients on the electrical system, it is desirable to disconnect the generator from the line and allow time for the throttle valve to close and the machine to come to a standstill or to a speed below rating and then proceed with a new hydraulic start. The dropout time of a standard time delay is only a few cycles and the closing time can be set for seconds or minutes.

The primary object of the present invention is to provide an improved apparatus for control of a generator which is hydraulically driven by a turbine coupled to a fluid flow duct wherein the apparatus provides for the protection of the system against overvoltage, sudden drop of line voltage and variations in frequency of the line voltage to thereby permit the generator to be operated unattended over long periods of time without damage to the apparatus or to the power line coupled to the generator.

Other objects will become apparent as the following specification progresses, reference being had to the single figure which shows a schematic view of the generator control apparatus of the present invention.

The generator control apparatus of the present invention is broadly denoted by the numeral 10 and is adapted for use with a hydraulically driven generator 12 having a drive shaft 14 coupled to a turbine shaft 16 having an impeller 18 thereon. One end of shaft 16 and impeller 18 are located in a duct 20 in which water or other fluid flows in the direction of arrows 22 through the duct. As the water flows through the duct, it contacts impeller 18 and rotates shaft 16 which, in turn, turns the shaft 14 of generator 12.

Generator 12 has three leads 24 which direct the electrical current generated thereby away therefrom to power mains 26, typically owned by a utility. Thus, apparatus 10 is suitable for use in generating electrical power by the flow of water or other fluid through duct 20, the electrical power then being suitable for sale to a utility which can then distribute the electrical power as it deems necessary or desirable.

Leads 24 are coupled to switches 28 of a contacter 30 having a coil 32 coupled to leads 34 and 36. Fuses 38 are coupled in series with leads 24 as are manual switches 40. A surge arrester 42 is coupled to leads 24 for protection against electrical surges. Portions of leads 24, contacter 30, fuses 38 and switches 40 can be located in a cabinet 44 identified by dashed lines in the figure. This cabinet typically is adajacent to generator 12 and is coupled by output leads 46 to a power meter 48 which is coupled by lockable safety switches 50 to power means 26.

A one-fourth turn butterfly valve 52 is located in duct 20 upstream of impeller 18. Valve 52 is coupled to a fluid actuated valve operator 54 which has a piston operated by water pressure directed into the operator housing through a line 56 which is coupled to a line 58 and a line 60, line 60 having an end 62 communicating with duct 20 upstream of valve 52. A needle valve 59 is in line 58, and a solenoid valve 64 is in line 60 and is operated when a coil 66 coupled to leads 68 and 69 is energized. Valve 64 is normally closed so that, when the electrical power is applied to coil 66 after a short time delay, valve 64 opens.

A second solenoid actuated valve 70 is in series with a line 71 communicating with line 56. Valve 70 has a solenoid 72 coupled to leads 74 and 76. Valve 70 is normally open and closes when power is supplied to coil 72. A needle valve 78 is in series with a line 80 placing duct 20 in fluid communication with operator 54 through a needle valve 59 in line 58. Relative adjustments of needle valves 59 and 78 can control the normal speed of operation of operator 54.

A differential pressure switch 82 has fluid lines 84 and 86 on the upstream and downstream sides, respectively, of impeller 18. Switch 82 is coupled to leads 88 and 74.

A float switch 92 having a float 94 is coupled by leads 96 and 98 to leads 74 and 68, respectively. Switches 100 and 90 are in parallel and series, respectively, with switch 92, switches 100 and 90 being manually actuatable as needed for testing. Switch 92 is float actuated and is closed when float 94 floats above a certain level of the water or fluid in a tank (not shown) associated with duct 20.

A control transformer 102 has a primary winding coupled across a pair of leads 24. The secondary 106 of transformer 102 is coupled to lead 134 and to another lead 108, leads 134 and 108 being coupled to leads 134 and 74, respectively. A run-stop switch 110 is in series with secondary 106 of transformer 102. Thus, the transformer provides the power necessary to energize the coils 66 and 72 of solenoid valves 64 and 70 and also coil 32 of contacter 30.

Leads 68 and 69 coupled with coil 66 of solenoid valve 64 are coupled to leads 112 and 114 across which are an operation counter 116 and an hours operational counter 118. In addition to that, an overvoltage relay 120 having a switch 122, and a frequency relay 124 having a switch 126 are connected to lead 109 of transformer 102. A time delay relay 128 having a switch 130 is coupled across leads 112 and 132. A bypass line 132 connects lead 134 with point 136 in bypassing relationship to switches 122 and 126.

In operation, assuming float switch 94 is in a suitable tank of water or other fluid at a certain level, float switch 92 will be normally closed. Initially, butterfly valve 52 will be closed and there will be no water flow through duct 20. Valve 64 will be normally closed when coil 66 is not energized, and valve 70 will be normally open when coil 72 is not energized. Contacter 30 will initially be in a condition in which switches 28 are open. Manual switches 40 can be closed before commencing operation.

To start the operation of generator 12, switch 110 is manually closed and, when this occurs, coil 66 of solenoid 64 is energized if float switch 92 is closed. This occurs after a small time delay by virtue of time delay relay 128. If the float switch 92 is open, nothing happens until the float switch does close.

Assuming that float switch 92 is closed and the time delay associated with relay 128 has elapsed, solenoid coil 66 will be energized, opening valve 64, allowing water from duct 20 to enter and flow from opening 62 through lines 60, 58 and 56 to operator 54. This creates water pressure against the movable piston of the operator and causes butterfly valve 52 to open slowly and allow water to flow through duct 20 past impeller 18. When this occurs, the shaft 16 is rotated to operate generator 12 and the flow of water will cause a build-up of differential pressure across the impeller 18. This differential pressure will be sensed by pressure switch 82 which will close when the differential is enough to produce rated speed at no load and energize contacter 30 and close switches 28. Electrical power from generator 12 is then applied to power mains 26, and the load on the mains builds to a maximum value slowly. Operation can continue in a normal fashion so long as there is no sudden loss of line voltage or an overvoltage situation.

In the event of overvoltage or a deviation from a reference line frequency, switches 122 and 126 will open separately or together, thereby interrupting power to relay 128 and will also interrupt power to coils 66, 72 and 32 causing valve 64 to close and valve 70 to open and allow the rapid bleed of water from operator 54 through lines 56 and 71 and needle valves 51 and 78 to duct 20. This will cause a rapid closing of butterfly valve 52 until the overvoltage condition disappears.

If there is a sudden loss of line voltage on power mains 26, the power to primary 104 of transformer 102 will decrease, causing coil 32 of contacter 30 to lose power and thereby open switches 28. When this occurs, both coils 66 and 72 of valves 64 and 70, respectively, are de-energized, closing valve 64 and opening valve 70. Opening valve 70 permits water to flow rapidly out of operator 54 back into the duct, causing butterfly valve 52 to close rapidly so that generator 12 goes only part way to overspeed then coasts to a standstill. Another start of the system can occur only after voltage is restored plus a time delay as established by time delay relay 128.

If the line voltage of power mains 26 drops partially, the contacter drops out at approximately 70% of the output voltage of transformer 102. Then, coil 66 will be de-energized because it is coupled to the secondary 106 of transformer 102, and the butterfly valve 52 is closed.

As contacter 30 drops out, and if solenoid coil 72 loses power, valve 70 is quickly opened and the water pressure driving operator 54 is relieved, closing butterfly valve 52. The turbine thus stops rapidly. If only the solenoid coil 66 drops out, the unit stops after overspeed. If voltage returns at overspeed, the overcurrent trips contacter 30 and the generator returns to normal operation.

Operator 54 can be of any conventional type having a spring return hydraulic piston. The operator can be of the type known as a hydraulic actuator, Model 960CFS, supplied by Hills-McCanna of Carpentersville, Ill. The butterfly valve 52 can be of any diameter, such as a 10" diameter. A typical valve of this type is one supplied by Key Pipe and Supply of San Jose, Calif. The turbine can be a 20 kilowatt turbine operated on a 115-foot head. The generator 12 is a standard three phase induction motor. The differential pressure switch 82 can be one made by Square D Company of Milwaukee, Wis., and identified as Class 9012, Type AEW5.

What is claimed is:

1. Control apparatus for an electrical generator for supplying electrical power to a power system and driven by a turbine rotor in a fluid delivery duct provided with a shiftable throttle valve therein comprising:

a fluid actuated operator having means for coupling the operator with the throttle valve to open and close the same as a function of water pressure applied to or removed from the operator;

a first fluid line for coupling the duct to the operator to supply fluid thereto from the duct for actuating the operator to cause opening of the throttle valve;

first electrically actuated valve means for opening the first fluid line to permit fluid to flow therethrough to the operator to open the valve;

a second fluid line coupled with the operator for draining the fluid therefrom when the same has been actuated;

second electrically actuated valve means for opening the second fluid line to drain the fluid from the operator, whereby the throttle valve will then be caused to close; and means coupled with the first valve means and the second valve means for actuating and deactuating the same as a function of the voltage of the power system to which the generator is supplying power.

2. Apparatus as set forth in claim 1, wherein is included a differential pressure switch having means for coupling the same to the duct to determine the fluid pressure difference on opposite sides of the turbine rotor, said pressure switch being adapted to be coupled to the output power lines of said generator to close said output power lines when the rotor speed reaches a predetermined value and to open said output power lines when the rotor speed falls below said predetermined value.

3. Apparatus as set forth in claim 2, wherein is included a contacter having switch means adapted to be coupled with the output power lines of the generator, said pressure switch being coupled with the contacter to deactuate the latter and thereby open said switch means when the rotor speed is different from said predetermined value.

4. Apparatus as set forth in claim 1, wherein is included a float switch coupled with said first valve means and said second valve means to enable the same.

5. Apparatus as set forth in claim 1, wherein is included a time delay relay means coupled with said first valve means for actuating the same after a delay period when they are placed under the influence of said actuating and deactuating means.

6. Apparatus as set forth in claim 1, wherein is included a relay means responsive to overvoltage of the power output of the generator for deactuating the first valve means and said second valve means.

7. Apparatus as set forth in claim 1, wherein is included a relay means responsive to a deviation of output voltage frequency from a predetermined value for deactuating the first valve means and the second valve means.

8. Apparatus as set forth in claim 1, wherein is included a differential pressure switch having means for coupling the same to the duct to determine the fluid pressure difference on opposite sides of the turbine rotor, said pressure switch being operable to disable the power output of the generator when the rotor speed is different from a predetermined value, and including a first relay means coupled with the first valve means and said second valve means for actuating the same after a predetermined time period when they are placed under the influence of said actuating and deactuating means.

9. Apparatus as set forth in claim 8, wherein said actuating and deactuating means includes a second relay means responsive to overvoltage of the power output of the generator for deactuating the first valve means and said second valve means, and a third relay means responsive to a deviation of output voltage frequency from a predetermined value for deactuating the first valve means and said second valve means.

10. Apparatus as set forth in claim 1, wherein said first valve means and said second valve means are solenoid valves.

11. A method of controlling the operation of a hydraulically actuated electrical generator for supplying power to power mains and being coupled to a turbine rotor in a fluid flow duct having a throttle valve, said method comprising:

opening the throttle valve as a function of the fluid pressure in the duct upstream of the throttle valve, whereby the rotor will actuate the generator;

sensing the rotation of the rotor;

coupling the power mains to the generator as a function of the sensing step; and closing the throttle valve as a function of loss of power at the power mains.

12. A method as set forth in claim 11, wherein said sensing step includes detecting the speed of rotation of the rotor.

13. A method as set forth in claim 12, wherein said detecting step includes determining the fluid pressure difference across the rotor.

14. A method as set forth in claim 11, wherein is included the step of closing the throttle valve as a function of the overvoltage at said power mains.

15. A method as set forth in claim 11, wherein is included the step of closing the throttle valve as a function of the deviation of the frequency of the power main voltage from a predetermined value.

* * * * *